United States Patent
Walewski

(10) Patent No.: US 9,020,338 B2
(45) Date of Patent: Apr. 28, 2015

(54) METHOD AND ARRANGEMENT FOR STABILIZING A COLOUR CODING METHOD FOR OPTICAL TRANSMISSION OF DATA

(75) Inventor: Joachim Walewski, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 62 days.

(21) Appl. No.: 13/697,848

(22) PCT Filed: May 17, 2011

(86) PCT No.: PCT/EP2011/057961
§ 371 (c)(1),
(2), (4) Date: Nov. 14, 2012

(87) PCT Pub. No.: WO2011/144607
PCT Pub. Date: Nov. 24, 2011

(65) Prior Publication Data
US 2013/0064541 A1    Mar. 14, 2013

(30) Foreign Application Priority Data

May 17, 2010   (EP) .................................... 10005131
May 17, 2010   (EP) .................................... 10005134

(51) Int. Cl.
H04B 10/08   (2006.01)
H04B 10/00   (2013.01)
(Continued)

(52) U.S. Cl.
CPC ............ *H04B 10/116* (2013.01); *H04B 10/114* (2013.01)

(58) Field of Classification Search
CPC ....... H04B 10/116; H04N 11/04; H04N 7/22; H04N 9/64
USPC ..................... 398/25, 119, 158, 172, 183, 186
See application file for complete search history.

(56) References Cited

U.S. PATENT DOCUMENTS 5,475,520 A * 12/1995 Wissinger ...................... 398/118
5,822,099 A * 10/1998 Takamatsu ..................... 398/162
(Continued)

FOREIGN PATENT DOCUMENTS

CN   1914818 A    2/2007
EP   2136484 A1   12/2009   ............. H04B 10/04
(Continued)

OTHER PUBLICATIONS

Sirdhar Rajagopal et al., IEEE 802.15.7 VLC PHY/MAC Proposal Samsung/ETRI, Date: Oct. 2009, File: (IEEE P802.15-09-0733-0007), Wireless Personal Area Networks.*
(Continued)

*Primary Examiner* — Ken Vanderpuye
*Assistant Examiner* — Abbas H Alagheband
(74) *Attorney, Agent, or Firm* — King & Spalding L.L.P.

(57) ABSTRACT

A method for optically transmitting data between a transmitter and a receiver is disclosed, in which a color coding method based on a plurality of elemental colors is provided for the coding and transmission of the data, which color coding method involves a respective elemental color being sent by a respective transmitter-end optical radiation source and being received at the receiver end by a respective optical radiation receiver. The method provides for a control loop to be formed between the transmitter and the receiver, wherein the transmitter sends calibration messages to the receiver, and wherein a piece of compensation information is ascertained by comparing at least one channel property of at least one received calibration message with a corresponding channel property of at least one previously sent calibration message, and wherein the transmitter takes the compensation information as a basis for adjusting at least one transmission parameter.

14 Claims, 8 Drawing Sheets

(51) Int. Cl.
*H04B 10/04* (2006.01)
*H04B 10/12* (2006.01)
*H04B 10/116* (2013.01)
*H04B 10/114* (2013.01)

(56) References Cited

U.S. PATENT DOCUMENTS

| | | | | |
|---|---|---|---|---|
| 6,014,236 | A * | 1/2000 | Flaherty | 398/66 |
| 6,400,871 | B1 * | 6/2002 | Minden | 385/39 |
| 7,039,322 | B1 * | 5/2006 | Yoshimura et al. | 398/141 |
| 7,068,617 | B1 * | 6/2006 | Mahant-Shetti et al. | 370/320 |
| 7,095,789 | B2 | 8/2006 | Ware et al. | 375/257 |
| 7,359,634 | B1 * | 4/2008 | Meli | 398/28 |
| 7,817,803 | B2 * | 10/2010 | Goldstein | 381/56 |
| 8,159,568 | B2 * | 4/2012 | Ahdoot | 348/241 |
| 8,195,054 | B2 * | 6/2012 | Son et al. | 398/172 |
| 8,253,353 | B2 * | 8/2012 | Baggen et al. | 315/308 |
| 8,468,154 | B2 * | 6/2013 | Leino et al. | 707/724 |
| 8,521,034 | B2 * | 8/2013 | Rajagopal et al. | 398/172 |
| 8,521,035 | B2 * | 8/2013 | Knapp et al. | 398/172 |
| 2002/0167701 | A1 * | 11/2002 | Hirata | 359/172 |
| 2002/0181055 | A1 * | 12/2002 | Christiansen et al. | 359/159 |
| 2004/0062551 | A1 * | 4/2004 | ElBatt et al. | 398/115 |
| 2006/0077087 | A1 * | 4/2006 | Moore et al. | 341/155 |
| 2006/0291574 | A1 | 12/2006 | Ware et al. | 375/257 |
| 2008/0181614 | A1 * | 7/2008 | Ann | 398/140 |
| 2008/0187033 | A1 | 8/2008 | Smith | 375/228 |
| 2008/0252664 | A1 * | 10/2008 | Huang et al. | 345/690 |
| 2010/0034540 | A1 * | 2/2010 | Togashi | 398/172 |
| 2010/0045189 | A1 * | 2/2010 | Storch et al. | 315/149 |
| 2010/0177678 | A1 * | 7/2010 | Sayegh | 370/315 |
| 2010/0215378 | A1 * | 8/2010 | Rajagopal et al. | 398/158 |
| 2010/0245634 | A1 * | 9/2010 | Ahdoot | 348/250 |
| 2011/0044701 | A1 * | 2/2011 | Schenk et al. | 398/183 |
| 2012/0224864 | A1 | 9/2012 | Walewski | 398/158 |
| 2012/0275796 | A1 * | 11/2012 | Yokoi | 398/130 |
| 2013/0266009 | A1 * | 10/2013 | Colloff et al. | 370/390 |
| 2013/0294537 | A1 * | 11/2013 | Cha et al. | 375/267 |

FOREIGN PATENT DOCUMENTS

| | | | | |
|---|---|---|---|---|
| KR | 20100014737 | A | 2/2010 | H04B 10/11 |
| WO | 2004/068745 | A1 | 8/2004 | H04B 10/10 |
| WO | 2009/010916 | A3 | 1/2009 | |
| WO | 2011/061073 | A1 | 5/2011 | H04B 10/10 |
| WO | 2011/144607 | A1 | 11/2011 | H04B 10/10 |

OTHER PUBLICATIONS

Yokoi, Atsuya, "Color Multiplex Coding for VLC," IEEE 802.15-08-0743-01, Samsung Yokohama Research Institute, 17 pages.
IEEE 802.15.7 Draft 1, "IEEE Standard for Information Technology—Telecommunications and Information Exchange Between Systems—Local and Metropolitan Area Networks—Specific Requirements—Part 15.7: Wireless Medium Access Control (MAC) and Physical Layer (PHY) Specifications for Visible Light Wireless Personal Area Networks (WPANs)," IEEE Wireless MAC and PHY Specifications for VLAC WPANS, Std 802.15.7 draft, 316 pages.
International Search Report and Written Opinion, Application No. PCT/EP2011/057961, 17 pages.
Korean Office Action, Application No. 1020127032987, 3 pages.
Chinese Office Action, Application No. 201180024397.2, 12 pages, Nov. 21, 2014.

* cited by examiner

METHOD AND ARRANGEMENT FOR STABILIZING A COLOUR CODING METHOD FOR OPTICAL TRANSMISSION OF DATA

CROSS-REFERENCE TO RELATED APPLICATIONS

This application is a U.S. National Stage Application of International Application No. PCT/EP2011/057961 filed May 17, 2011, which designates the United States of America, and claims priority to EP Patent Application No. 10005131.7 filed May 17, 2010 and EP Patent Application No. 10005134.1 filed May 17, 2010. The contents of which are hereby incorporated by reference in their entirety.

TECHNICAL FIELD

This disclosure relates to a method and arrangement for stabilizing a color coding method for optical transmission of data.

BACKGROUND

Data transmission by means of visible light is known from the prior art ("visible light communications", VLC), which can be used, for example, as a supplement to conventional radio technology. Data can be transmitted in this situation, for example, by light-emitting diodes (LED). A data flow which is to be transmitted is in this situation transmitted, for example, in the form of modulations not perceptible to human beings.

Moreover, a more recent coding method for visible light is known, which is based on a color coding with elementary colors. Reference is made to such a method by persons skilled in the art by the term CSK ("Color Shift Keying"). Other older designations for this coding method are CCM ("Color Code Modulation") or CMC ("Color Multiplex Coding").

The functional principle of VLC making use of this color coding method includes, roughly speaking, of using an illumination mixed from several elementary colors for the additional transmission of data, wherein the individual elementary colors are modulated in such a rapid manner that, overall, the human eye recognizes one continuous mixed color. Usually the three elementary colors red, green, and blue are used for this, which can be emitted in a technically sophisticated manner by appropriate light-emitting diodes.

A detailed description of CSK can be found in the Modification Proposal to the Standard IEEE P802.15.7, Yokoi et al.: "Modified Text Clause 6.9.2.2", Jan. 17, 2010, Document Identification "15-10-0036-00-0007". One of the applications proposed for CSK is VLC, i.e. free-space communications with light.

In the modification proposal referred to, a receiver-end compensation is described for changes in the optical performance of the elementary color light-emitting diodes provided at the transmitter end. A compensation of the radiation emitted at the transmitter end is not provided for according to this modification proposal, due to the compensation at the receiver end only.

A method for transmitter-end compensation was proposed by the Applicant in an International Patent Application filed on 05.11.2010 with the Application Reference PCT/EP2010/066907 and the title "Method and arrangement for the stabilization of a color coding method for optical transmission of data". In the method referred to, provision is made for a calibration message to be sent from the transmitter to the receiver. In the receiver, a piece of compensation information is ascertained by comparing a channel property derived from the received calibration message with a channel property stored beforehand in the receiver. This piece of compensation information is sent to the transmitter, in which, on the basis of the compensation information ascertained, an adjustment is made to at least one transmission parameter.

The proposed method does indeed make possible the transmitter-end compensation of the optical performance, but has the disadvantage that its implementation requires extensive modifications in the protocol of the control messages exchanged. For example, an additional control message is required for the transmission of the compensation information, which is not provided for in the protocol beforehand. A further disadvantage of the proposed method lies in the fact that storage of channel properties and a calculation of the compensation information on the basis of a stored channel property take place in the receiver, which imposes additional demands on the resources of the receiver.

SUMMARY

In one embodiment, a method for stabilizing a color coding for optical transmission of data is provided, wherein a color coding method based on a plurality of elementary colors is provided for the transmission of the data between a transmitter and receiver, wherein a respective elementary color is transmitted by at least one transmitter-end optical radiation source and is received at the receiver end by at least one respective optical radiation receiver, wherein at least one calibration message is formed by the transmitter, which comprises at least one calibration message comprising at least one time sequence, within which at least one optical radiation source allocated to an elementary color is adjusted with a value of an optical performance which is to be sent, wherein the at least one calibration method is sent by the transmitter, wherein the at least one calibration message is received in the receiver, and a respective value of an optical performance received at the respective optical radiation receiver is ascertained and sent to the transmitter, wherein, in the transmitter, the respective value of the optical performance received at the respective optical radiation receiver is compared with the respective value of the optical performance sent at the respective optical radiation source, and wherein, on the basis of the relationship, a piece of compensation information is ascertained, wherein, on the basis of the compensation information, an adjustment is carried out of at least one transmission parameter.

In a further embodiment, the calibration message is formed as a CVD frame. In a further embodiment, a plurality of sequential calibration messages contain in each case an identical coding, which corresponds to a corner point in a constellation diagram. In a further embodiment, the optical performance received at the respective optical radiation receiver is ascertained, which is received with the identical coding in each case, after one or a plurality of sequential calibration messages, which may be formed as what are referred to as visibility frames. In a further embodiment, a mean value is formed from values of the optical performance received at the respective optical radiation receiver. In a further embodiment, the method is characterized by an association method for the allocation of a network node by a coordinator, wherein the scope and type of the stabilization of the color coding is determined by the coordinator. In a further embodiment, an allocation response is provided, wherein the network node transmits to the coordinator technical capabilities for carrying out the stabilization of the color coding. In a further embodiment, a message is provided wherein a definition of a time interval is transmitted, after the expiry of which a renewed stabilization of a color coding is triggered.

In another embodiment, an optical transmission system is provided for the optical transmission of data between a transmitter and a receiver, established for the coding and transmission of data, making use of a color coding method based on a plurality of elementary colors, with a respective transmitter-end optical radiation source for the transmission of a respective elementary color and a respective receiver-end optical radiation receiver for the reception of a respective elementary color, the optical transmission system comprising: an evaluation unit provided in the receiver for the determination of a respective value of an optical performance received at a respective optical radiation receiver, a back channel for transmitting the respective value determined by the evaluation unit; a color stabilization module provided in the transmitter, for the determination of at least one compensation factor on the basis of a relationship between the respective value of the optical performance received at the respective optical radiation receiver and a respective value of an optical performance transmitted to the respective optical radiation source; and a correction element provided in the transmitter for the determination of at least one piece of compensation information on the basis of the relationship, and the adjustment of at least one transmission parameter on the basis of the compensation information.

In some embodiments, the optical transmission system is configured to carry out any of the method disclosed above.

BRIEF DESCRIPTION OF THE DRAWINGS

Example embodiments will be explained in more detail below with reference to figures, in which.

DETAILED DESCRIPTION

Figure 1:
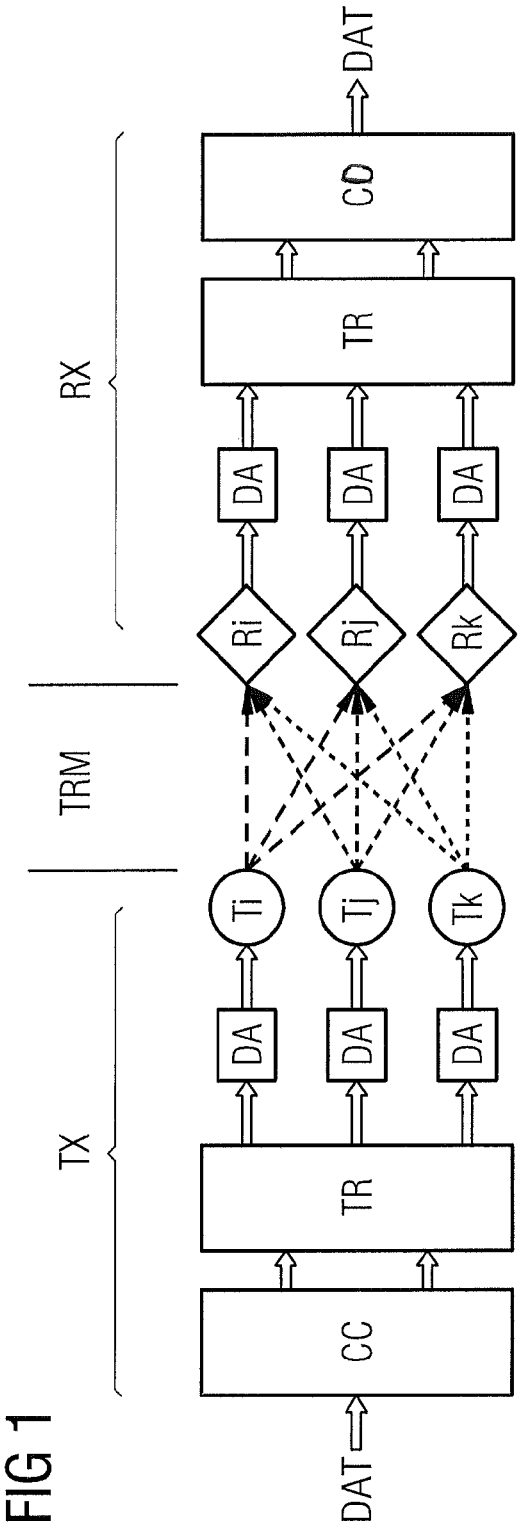
FIG. 1 illustrates a structural image as a diagrammatic representation of an optical transmission system.

Some embodiments provide means for the transmitter-end compensation of the spectrum of the transmitted optical radiation, which imposes lesser demands on the modifications required for the implementation of the compensation means.

For example, some embodiments provide a method for stabilizing a color coding method for optical transmission of data between a transmitter and a receiver, wherein, for the coding and transmission of the data, a color coding method is provided which is based on a plurality of elementary colors, wherein a respective elementary color is sent by at least one respective transmitter-end optical radiation source and is received at the receiver end by a respective optical radiation receiver.

A calibration message formed by the transmitter comprises at least one time sequence, within which at least one optical radiation source allocated to an elementary color is adjusted by a value of an optical performance which is to be transmitted. In other words, by means of this calibration message the radiation sources provided for the respective elementary color are actuated in a defined manner, such that it is subsequently possible to ascertain a relationship between the optical performance transmitted by the respective radiation sources and the optical performance received at the respective radiation receivers. The calibration message is received at the receiver; subsequently a respective value is ascertained of an optical performance received at the respective optical radiation receiver. The respective values of the optical performance received at the respective optical radiation receiver are then transmitted to the transmitter.

According to some embodiments, in the transmitter the respective value of the optical performance received at the respective optical radiation receiver is put in relation to the respective value of the optical performance transmitted at the respective optical radiation source. On the basis of the relationship, a piece of compensation information is ascertained, wherein, on the basis of the compensation information, a transmitter-end adjustment is carried out of at least one transmission parameter.

The terms "transmitter" and "receiver" are to be understood throughout such that the "transmitter", in addition to its property of transmitting as well as receiving data in a duplex mode, functions simultaneously as a light source, while the "receiver" is indeed capable of sending and receiving data in a duplex mode, but is not necessarily operated as a light source. Operation of the transmitter as a light source includes an embodiment, by way of example, as ambient lighting or as a display board.

The term "respective optical radiation receiver" includes, from case to case, one or more radiation receivers, which are provided for the receiving of one or more elementary colors. The same applies accordingly to the respective optical radiation source.

Some embodiments may advantageously provide a transmitter-end compensation of the mixed color of the transmitted optical radiation, which has, for example, been changed by an intensity drift of an individual elementary color.

In some embodiments, only minor changes need to be carried out in the protocol. With receiver-end protocol processing, only the ascertaining of the optical performance provided for a respective elementary color is provided for, as well as the transmission of the respective value of the optical performance via a return or back channel to the transmitter. The ascertaining first referred to does not require any change in the sequences otherwise provided for the receiving and ascertaining of values of the optical performance. The return transmission, referred to secondly, of the respective value of the optical performance, is advantageously restricted to a "relaying" procedure, wherein the simple return of received values is associated with only little effort with regard to the protocols. Particularly advantageous is the relieving of the receiver of the measures known from the prior art, which made it necessary for data to be retained and a calculation of an item of compensation information from the data retained and currently being measured. The effort of implementation and calculation is now transferred to the transmitter, which is of considerable advantage when the transmitter is allocated a more central role in the compensation procedure.

Some embodiments relate to an association between the transmitter and the receiver. Some embodiments provide an improved bandwidth efficiency in comparison with the method known heretofore of a calibration message sent from the transmitter to the receiver. This improved bandwidth efficiency is attributable to the fact that configuration messages only need to be exchanged once during an association, and that subsequent determinations of the optical performance received at the respective optical radiation receiver are only carried out if what are referred to as calibration messages or "visibility frames" are transmitted by the transmitter. Visibility frames are transmitted, for example, if at present there are no other types to be transmitted. The color stabilization according to certain embodiments therefore in principle does not compete with the data traffic, as was the case with the previous methods referred to.

FIG. 1 shows an optical data transmission system based on CSK ("Color Shift Keying") for visible light, such as a VLC system ("Visible Light Communication").

The data transmission system comprises a transmitter TX, a transmission path TRM, and a receiver RX. The transmission system operates in duplex mode, in which the transmitter TX can both send data as well as receive it. The same applies accordingly to the receiver RX.

The CSK method is based on a color coding with a plurality of elementary colors, such as red, green, and blue. A detailed description of CSK is to be found in the Modification Proposal to the Standard IEEE P802.15.7, Yokoi et al.: "6.9.2.2", Jan. 17, 2010, Document Identification "15-10-0036-00-0007".

In FIG. 1, for reasons of simplicity, at the transmitter end TX only the functional units necessary for the transmission are represented, and at the receiver end RX the functional units necessary for reception.

On the basis of FIG. 1, a transmission function of a CSK system is considered. In a general sense, A hereinafter designates a matrix, and a a column vector.

On the transmitter end TX, digital data DAT is first fed to a color coder CC. The data DAT is converted in the color coder into XY values in accordance with a mapping rule. These XY values correspond to values in an XY color coordinate system in accordance with FIG. 3, to be described later.

At the output of the color coder CC, this two-dimensional data, symbolized in the drawing by two arrows, is fed to a transformer TR, at the output of which three digital signal intensity values are provided for a signal of one of three elementary colors respectively. The three digital signal intensity values for the respective elementary color indices i, j, k are described in a signal intensity vector:

$$s_{Tx}^{(b)} := \begin{pmatrix} s_{Tx,i}^{(b)} \\ s_{Tx,j}^{(b)} \\ s_{Tx,k}^{(b)} \end{pmatrix}$$

Here and hereinafter, the common index Tx stands for a transmitter-end value. The superscript (b) stands for a binary value of a corresponding signal intensity value.

A respective digital signal intensity value is fed to a converter DA, in which the digital signal intensity values are converted into analog signal values. The three analog signal values are described as respective electrical current values for the respective elementary color indices i, j, k in a current intensity vector:

$$i_{Tx} := \begin{pmatrix} i_{Tx,i} \\ i_{Tx,j} \\ i_{Tx,k} \end{pmatrix}$$

These analog signal values are fed to a respective allocated optical radiation source Ti, Tj, Tk, i.e. to a first optical radiation source Ti, a second optical radiation source Tj, and a third optical radiation source Tk.

According to an example embodiment, the first optical radiation source Ti corresponds to a red LED, the second optical radiation source Tj to a green LED, and the third optical radiation source Tk to a blue LED.

The optical radiation transmitted in this way from the respective radiation sources Ti, Tj, Tk is fed over a transmission path TRM in the direction of the receiver RX.

The optical performance components radiated by the respective radiation sources Ti, Tj, Tk are described in a vector of the optical performance which is transmitted:

$$p_{Tx} := \begin{pmatrix} p_{Tx,i} \\ p_{Tx,j} \\ p_{Yx,k} \end{pmatrix}$$

At the receiver RX end, the optical radiation which is transmitted arrives at a radiation receiver Ri, Rj, Rk adjusted to a respective elementary color, namely a first optical radiation receiver Ri, a second optical radiation receiver Rj, and a third optical radiation receiver Rj.

The optical performance components which arrive at the respective radiation receivers Ri, Rj, Rk are described in a vector of the optical performance received:

$$p_{Rx} := \begin{pmatrix} p_{Rx,i} \\ p_{Rx,j} \\ p_{Rx,k} \end{pmatrix}$$

Here and hereinafter the common index Rx stands for a receiver-end value.

In an analog manner, running counter to the transmitter TX, in the receiver RX the respective optical signal is converted by the optical radiation receivers Ri, Rj, Rk into analog signals. The three analog signal values are described as respective electrical current values for the respective elementary color indices i, j, k, in a current value vector:

$$i_{Rx} := \begin{pmatrix} i_{Rx,i} \\ i_{Rx,j} \\ i_{Rx,k} \end{pmatrix}$$

The electrical analog signal is fed to a respective converter DA, in which a respective conversion of the respective analog signal values into a respective digital signal intensity value takes place. The three signal intensity values for the respective elementary color indices i, j, k, are described in a signal intensity vector:

$$s_{Rx}^{(b)} := \begin{pmatrix} s_{Rx,i}^{(b)} \\ s_{Rx,j}^{(b)} \\ s_{Rx,k}^{(b)} \end{pmatrix}$$

The digital signal intensity values acquired at the three respective converters DA are fed to a transformer TR, which carries out a conversion in a manner counter to the transmitter TX of the value triplet into a value doublet, which in turn is conducted to a color decoder CD, at the output of which, finally, data DAT is acquired, which in a correct operating mode is identical to the data DAT fed to the transmitter TX.

Hereinafter a calculation relationship between individual values is represented.

According to $$p_{Rx} = T p_{Tx}$$

a relationship is described between the optical performance received and transmitted, by multiplication of the optical performance transmitted with a transmittance matrix T. The transmittance matrix T describes the optical transmittance of a respective elementary color radiation source Ti, Tj, Tk, to a radiation receiver Ri, Rj, Rk provided for a respectively different elementary color. The coefficients of the transmittance matrix T are represented as follows:

$$T := \begin{pmatrix} t_{ii} t_{ij} t_{ik} \\ t_{ji} t_{jj} t_{jk} \\ t_{ki} t_{kj} t_{kk} \end{pmatrix}$$

In other words, the transmittance matrix T describes the propagation characteristics of the light, e.g. how much of a red light transmitted by the first optical radiation source Ti arrives at the third radiation receiver Rk, provided for blue light. This relationship is determined by the coefficients $t_{ki}$.

A further relationship can be described between the current intensity emitted by the radiation receivers Ri,Rj,Rk, and the optical performance received:

$$i_{Rx} = E p_{Tx}$$

The equation describes a relationship between the current intensity emitted by the radiation receivers Ri,Rj,Rk, and the optical performance received, by multiplication of the optical performance received by a sensitivity matrix E. The sensitivity matrix E describes the sensitivity of one of the color-selective radiation receivers Ri,Rj,Rk (photoreceptors) at the reception of one of the elementary colors.

Typically, but not absolutely necessarily, precisely as many radiation receivers Ri,Rj,Rk are used as elementary light-emitting diodes, i.e. optical radiation sources Ti,Tj,Tk. With an allocation of the index i to "red", j to "green", and k to "blue", the element $e_{ii}$ of the matrix E is, for example, the sensitivity of the red photoreceptor at the reception of the light emitted by the red LED. The sensitivity matrix E accordingly takes account of the spectral efficiency of a respective radiation receiver Ri,Rj,Rk responding to an elementary color, and additionally of a color filter which may be provided, as well as, by an appropriate linear combination of the coefficients of the sensitivity matrix E, a "crosstalk" between the radiation receivers Ri,Rj,Rk responding to a respective elementary color. The coefficients of the sensitivity matrix E are represented as follows:

$$E := \begin{pmatrix} e_{ii} e_{ik} e_{ik} \\ e_{ji} e_{jj} e_{jk} \\ e_{ki} e_{kj} e_{kk} \end{pmatrix}$$

A further relationship can be described between respective digital signal intensity values, summarized in a signal intensity vector, and the respective current intensity emitted by the radiation receivers Ri,Rj,Rk:

$$s_{Rx}^{(b)} = \{B i_{Rx}\}_{A/D}$$

Here and hereinafter the operand $\{.\}_{A/D}$ identifies a value converted by an analog-digital converter of the argument in the curved brackets.

A receiver-end conversion matrix B is a diagonal matrix and describes the conversion factor between the analog and the digital receiver signal.

Finally, by analogy with the relationship referred to heretofore, at the transmitter end TX a relationship can also be established between the respective current intensities fed to the respective radiation sources Ti,Tj,Tk and the respective digital signal intensity value, summarized in a signal intensity vector:

$$i_{Tx} = A \{s_{(Tx)}^{(b)}\}_{D/A}$$

Here and hereinafter the operand $\{.\}_{A/D}$ identifies a value converted by an analog-digital converter of the argument in the curved brackets.

A transmitter-end conversion matrix A is likewise a diagonal matrix and describes the relationship between the respective digital signal intensity value and the respective driver alternating current conducted to the respective radiation sources Ti,Tj,Tk. The coefficients of the transmitter-end conversion matrix A are represented as follows:

$$A := \begin{pmatrix} \alpha_i 0 0 \\ 0 \alpha_j 0 \\ 0 0 \alpha_k \end{pmatrix}$$

The following equation creates a relationship between the receiver-end and the transmitter-end signal intensity vector:

$$s_{Rx}^{(b)} \{BET f(A \{s_{Tx}^{(b)}\}_{D/A})\}_{A/D}.$$

If in the course of time the quantum efficiency of one of the optical radiation sources Ti,Tj,Tk changes, in other words the ratio of the respective driver current introduced into the optical performance, this goes into a modified function f', with a change in the function f. Accordingly, with the same transmitter signals, the received signals change, and accordingly, in accordance with the equation given above, also the receiver-end signal intensity vector $s_{Rx}^{(b)}$. If these values are available at the transmitter TX end, then a relationship can be derived according to $$f'(As_{Tx}) = f(As_{Tx}) f(As_{Tx})^T \{s_{Rx} f(As_{Tx})^T\}^{-1} s_{Rx}'$$

The signal intensity vector $s_{Rx}'$ corresponds to a modified receiver-end signal intensity vector, wherein the modified receiver-end signal intensity vector $s_{Rx}'$ is derived in relation to the signal intensity vector $s_{Rx}$ on the basis of the change in the quantum efficiency referred to heretofore.

With the equation given above, because of an assumed adequately high bit length in the binary representation of the values used in the equation, it is assumed that the values are identical to their corresponding binary values, such that the superscript identifier (b), standing for a binary value, is no longer present in the above equation.

Moreover, because of an assumed adequately high quantification depth of the receiver-end analog-digital converter and of the transmitter-end digital-analog converter, the operands $\{.\}_{A/D}$ and $\{.\}_{D/A}$
are also eliminated from the above equation. In other words, it is assumed that the converted value is identical to the value which is to be converted.

Changes in the quantum efficiency are derived, for example, due to temperature changes or due to an ageing process in the radiation sources being transmitted. A change in the quantum efficiency means for the respective optical radiation source Ti,Tj,Tk that, with the same current, less or more optical performance is radiated.

It is intended that the stabilization should be achieved of the color coding method of a transmitter-end compensation of changes in the optical performance of the individual elementary color radiation sources. To do this, first the signal intensity vector transmitted is transformed with a compensation function c, such that the following equation is derived:

$$s_{Rx}^{(b)} = \{BETf'(A\{c(s_{Tx}^{(b)})\}_{D/A})\}$$

The equation above can be presented in an abbreviated form:

$$f(As_{Tx}) = f'(Ac[s_{Tx}])$$

The equation above presents a complex inverse problem, in respect of which there are at least two practical cases for which the equation in the closed form can be solved.

In both cases, there applies:

$$c(s_{TX}) = Cs_{TX}$$

wherein C is a diagonal matrix, which is also designated hereinafter as the compensation matrix C.

Figure 7:
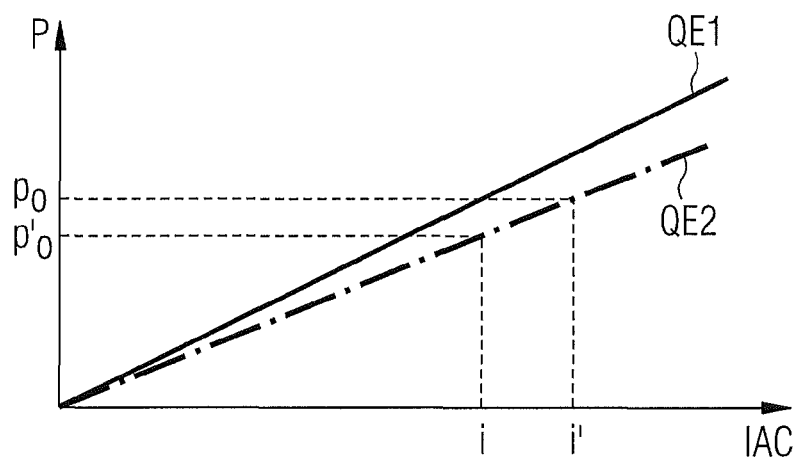
FIG. 7 illustrates an alternating current behavior of an optical radiation performance of a radiation source as a function of a supplied driver current.

For a first situation in which only the of the characteristic curve according to the function represented in FIG. 7 of the optical radiation performance of a radiation source dimensions are subject to change, as a function of the driver alternating current supplied, but not its curve shape, the characteristic vector function can be formulated as:

$$f(i_{Tx}) = \tilde{Q}g(i_{Tx})$$

where $\tilde{Q}$ is a diagonal matrix which is to be understood as a general quantum matrix which forms changes in the quantum efficiency of a respective radiation source Ti,Tj,Tk. By contrast, a vector function g defined in this way is independent of the quantum efficiency of a respective radiation source Ti,Tj, Tk. Compensation factors for this situation can be determined according to the following relationship:

$$C = A^{-1}g^{-1}(g(As_{Tx})g(As_{Tx})^T\{s_{Rx}'g(As_{Tx})^T\}^{-1}s_{Rx}) \{s_{Tx}s_{Tx}^T\}^{-1}$$

It is to be noted that the determination of compensation factors within the compensation matrix C, on the basis of the relationship shown above, is based on a number of determinable transmitter-end factors, as well as on one single receiver-end value, namely the receiver-end signal intensity vector $s_{RX}$. Other transmitter-end factors include the transmitter-end conversion matrix A and the vector functions g, independent of the quantum efficiency of a respective radiation source Ti,Tj,Tk.

In other words, if the receiver-end signal intensity vector $s_{RX}$ which is sent from the receiver to the transmitter is known, then a compensation of the transmitter-end radiation source and therefore a stabilization of the color coding is attained.

For a second purely linear case, for which g(i) is linear-dependent on i, i.e.:

$$g(i) \sim i$$

the determination of the compensation matrix C is simplified to:

$$C = s_{Tx}s_{Tx}^T\{s_{Rx}'s_{Tx}^T\}^{-1}s_{Rx}s_{Tx}^T\{s_{Tx}s_{Tx}^T\}^{-1}$$

It is to be noted that the determination of compensation factors within the compensation matrix C, on the basis of the relationship shown above, is based a determinable transmitter-end factor $s_{TX}$, as well as on one single receiver-end value, namely the receiver-end signal intensity vector $s_{RX}$.

In this second case too, if the receiver-end signal intensity vector $s_{RX}$ which is sent from the receiver to the transmitter is known, then a compensation of the transmitter-end radiation source and therefore a stabilization of the color coding is attained.

Figure 2:
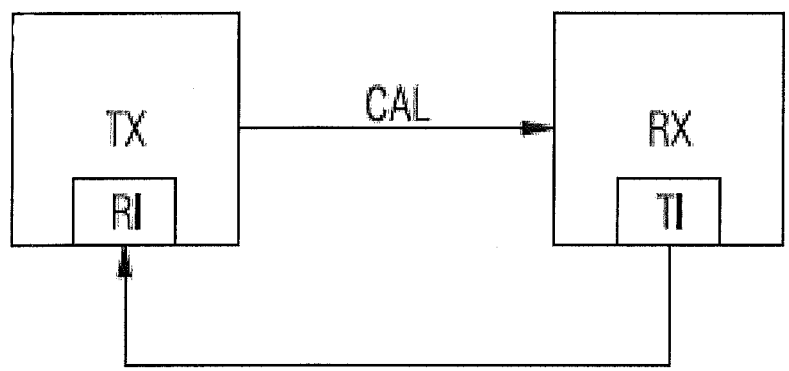
FIG. 2 illustrates a structural image as a diagrammatic representation of a control loop according to an example embodiment.
Figure 9:
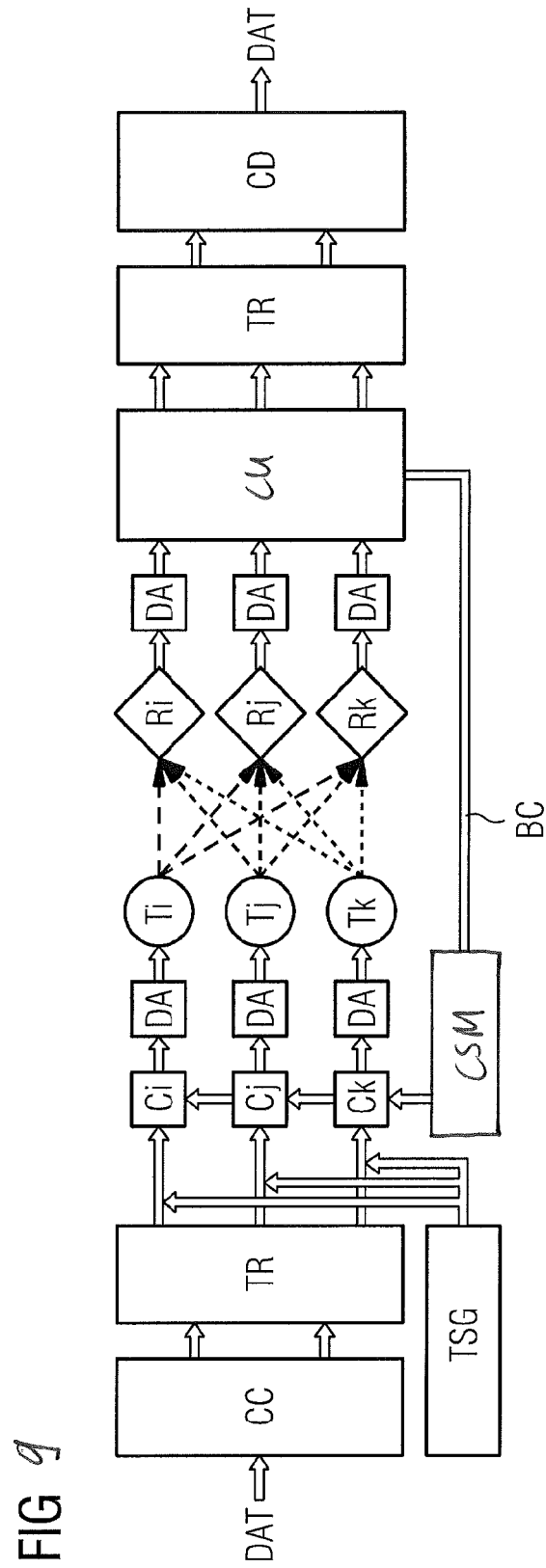
FIG. 9 illustrates a structural image as a diagrammatic representation of an optical transmission system according to a variant embodiment.

For the correction of the transmission parameters, the following method according to FIGS. 2 and 9 is proposed.

FIG. 2 shows first a principle illustration for the schematic representation of the control loop according to an example embodiment. In this situation, the functional units known from FIG. 1 are again represented, the transmitter TX and receiver RX.

The transmitter TX forms and transmits at least one calibration message CAL to the receiver RX. The calibration message CAL comprises at least one time sequence, within which the at least one optical radiation source allocated to an elementary color is adjusted by a value of an optical performance which is to be transmitted.

The calibration message CAL is to be received in the receiver RX. A specific value of an optical performance received at the respective optical radiation receiver is transmitted from the receiver RX within the framework of a corresponding message via a receiver-end transmission interface TI to the transmitter TX, via a reverse or back channel BC. There the message is received via a transmitter-end reception interface RI.

In the transmitter TX the respective value of the optical performance received at the respective optical radiation receiver is set in relationship to the respective value of the optical performance sent to the respective optical radiation source. On the basis of the relationships described above, a piece of compensation information is then ascertained, wherein, on the basis of the compensation information, an adjustment is carried out of at least one transmission parameter.

FIG. 9 shows, among other things, the functional components of an optical data transmission system known from FIG. 1, wherein the control loop shown in FIG. 2 is realized by means of the back channel BC.

At the transmitter TX end a calibration message generator TSG is provided, by means of which digital calibration messages are delivered to the input of a respective converter DA of a respective optical radiation source Ti,Tj,Tk. The calibration messages which are then converted and send via the optical radiation sources Ti,Tj,Tk are decoded accordingly at the transmitter RX end. In an evaluation unit CU a respective value is determined of an optical performance received at the respective optical radiation receiver Ri,Rj,Rk. The respective values are then sent in a corresponding message via the back channel BC to a color stabilization module CSM of the transmitter TX.

In the color stabilization module CSM the respective value of the optical performance received at the respective optical radiation receiver Ri,Rj,Rk is set in relation to the respective value of the optical performance sent to the respective optical radiation source Ti,Tj,Tk. As a result of this relationship, a piece of compensation information is determined, wherein, on the basis of the compensation information, an adjustment of at least one transmission parameter is carried out. To do this, in sequence, the digital signals which are to be sent are multiplied, by the insertion of a respective correction element Ci,Cj,Ck, with a respective piece of compensation information, such that the mixed color of the transmitted light again coincides with the original. For example, for a respective elementary color, a respective compensation factor is determined.

Figure 3:
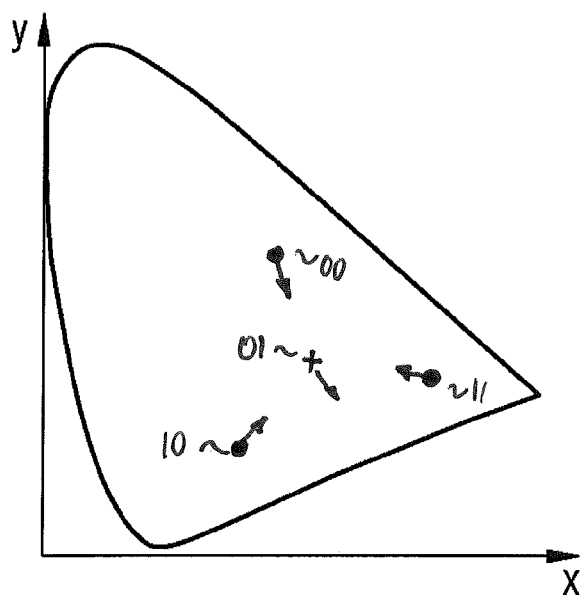
FIG. 3 illustrates a two-dimensional CIE standard color chart with a color allocation defined from four points, in a first representation.

Represented in FIG. 3 is a two-dimensional standard color chart in accordance with the definition of the International Commission on Illumination, CIE. In this situation, the three elementary colors, for example red, green, blue, are represented on two co-ordinates x, y. A third elementary color is determined for each point of the color chart by calculation from the two others, by way of the relationship x+y+z=1. In this situation, FIG. 3 shows a conversion (mapping), undertaken by means of the transformer TR shown in FIG. 1, of a two-dimensional xy-value into a three-dimensional signal data item.

Represented within the color chart according to FIG. 3 is a color allocation or color mapping for a 4-point CSK method, also referred to as 4 CSK. An appropriate 4 CSK transmission system is capable of transmitting two-bit data per transmitted symbol. In this situation four spectrum loci 00,01,10,11 are defined, wherein a spectrum locus 01 represented by a cross forms a focal point for the three other spectrum loci 01,10,11, arranged in the corner points of the arrangement shown. This focal point 01 is often also referred to as the "center of gravity". The other spectrum loci 00,10,11 define a further three symbols, which in this sequence correspond essentially to the elementary colors green, blue, and red.

An arrow represented at the focal point 01 symbolizes a drifting of the focal point 01, which can be incurred as a consequence of a change in a non-linear or direct-current related quantum efficiency of the radiation sources Ti,Tj,Tk due to a direct-current behavior of the light-emitting diodes used in the radiation sources Ti,Tj,Tk.

An arrow represented respectively at the spectrum loci 00,10,11 symbolizes a drifting of the off-center spectrum loci 00,10.11, which can be incurred as a consequence of a change in a linear or alternating-current related quantum efficiency of the radiation sources Ti,Tj,Tk due to an alternating-current behavior of the light-emitting diodes used in the radiation sources Ti,Tj,Tk.

Since the respective location and arrangement of the spectrum loci in the color arrangement in the manner explained are drawn on for the coding and decoding of the symbols, the diagram shown in FIG. 3 is also designated as a constellation diagram.

Figure 4:
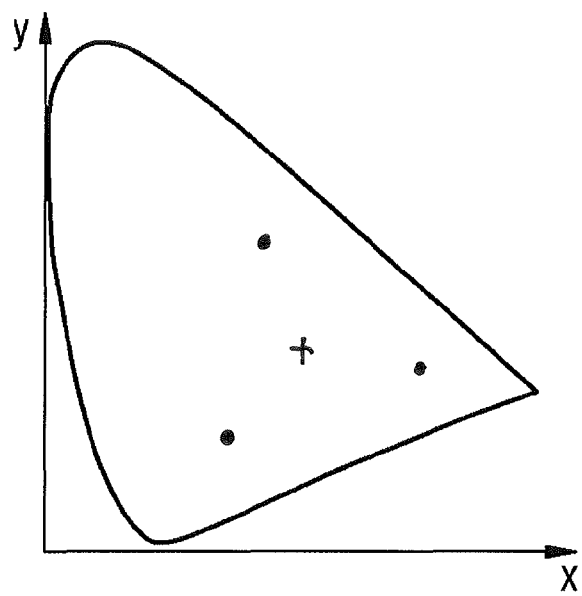
FIG. 4 illustrates a two-dimensional CIE standard color chart with a color allocation defined from four points, in a second representation.

In FIG. 4, the constellation diagram known from FIG. 3 is for a 4-point CSK method, also referred to as 4 CSK. The constellation diagram is represented without reference designations, in order to allow for comparability with a constellation diagram with a higher value symbol number in accordance with the following FIGS. 5 and 6.

Figure 5:
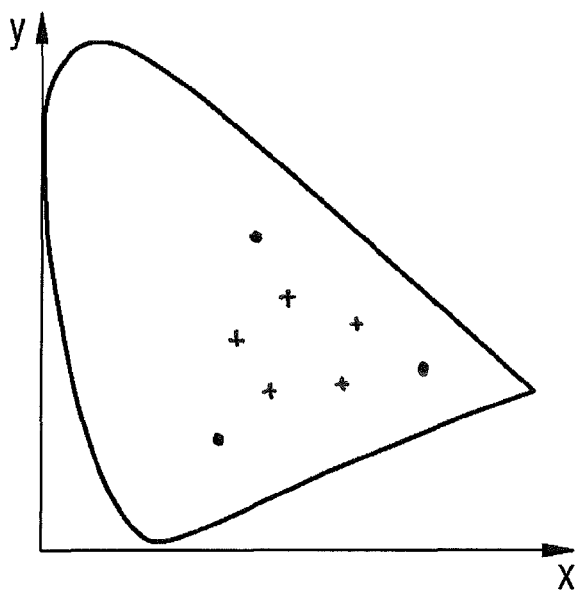
FIG. 5 illustrates a two-dimensional CIE standard color chart with a color allocation defined from eight points.
Figure 6:
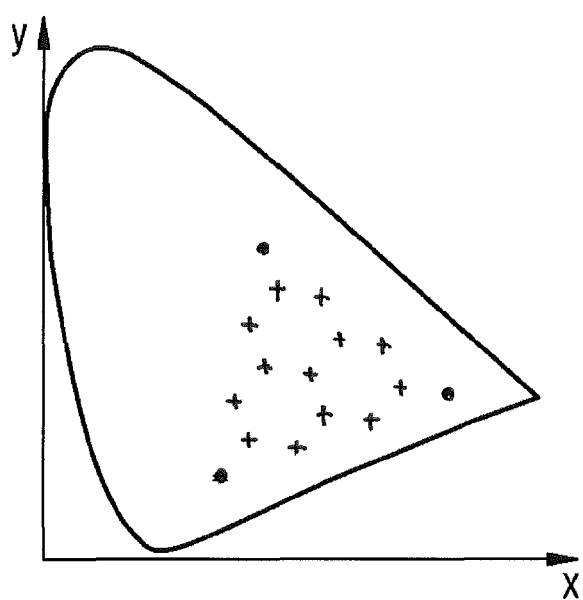
FIG. 6 illustrates a two-dimensional CIE standard color chart with a color allocation defined from 16 points.

The outermost symbols and corner points respectively, represented by points in this and the following FIGS. 5 and 6, remain retained in the higher-value color allocations. These corner points of the constellation diagram correspond essentially to the elementary colors green, blue, and red.

Represented in FIG. 5 is a constellation diagram for an 8-point CSK method, also referred to as 8 CSK, which allows for a coding depth of 3 bits per symbol. In this constellation the focal point, or "center of gravity", is not contained in the color coding.

Represented in FIG. 6 is a constellation diagram for a 16-point CSK method, also referred to as 16 CSK, which allows for a coding depth of 4 bits per symbol. In this constellation depth of 4 bits per symbol, the focal point is contained in the color coding, as it is in the coding depth of 2 bits per symbol explained heretofore.

A precondition for the compensation of the color coding, which is to be pursued in respect of a parallel utilization of an optical data transmission with an interior lighting arrangement, is that no changes are incurred in the appreciation by a human observer of the light color and light intensity due to the calibration messages transmitted by the optical radiation sources.

With regard to the color allocation shown in the FIGS. 4 to 6 above, this means that the focal point of each sequence of symbols sent in one or more calibration messages must coincide with the focal point of the respective constellation diagram. This coincidence is achieved either by only one symbol being transmitted, of which the spectrum locus coincides with the focal point of the constellation diagram.

As an alternative, a sequence of changing symbols is provided for, of which the determined geometric focal point coincides with the focal point of the constellation diagram. The latter second alternative has the advantage that it is also suitable for an 8 CSK color allocation according to FIG. 5, in which the focal point of the constellation is not contained in the color coding.

In an example embodiment, provision is therefore made for a sequence of changing symbols in one or more calibration messages, which run through the corner points of a respective constellation diagram cyclically. If three elementary colors, blue, green, red, are used, this means that the colors referred to are run through in a cyclic sequence, coded in corresponding symbols.

In the situation in which it is intended that a stabilization of a color coding should only be attained with regard to the alternating-current characteristics of the radiation sources by means of a corresponding recalibration, then it is sufficient for one or a few calibration messages to be sent, by means of which a sequence of successive symbols is transmitted, wherein each symbol corresponding to a respective elementary color is only transmitted once, or is also repeated in only a small number of repetitions.

If, by contrast, it is intended that a low-frequency thermal dynamic of the respective light radiation sources should be determined, in other words the direct-current behavior, then one transmission of only one or a few symbols is too short to achieve a thermal equilibrium necessary for this.

The said low-frequency thermal dynamic of the radiation source influences on the one hand a closed-circuit current stabilization and therefore the location of the focal point in the constellation diagram, and, on the other, also influences the appreciable average color in the radiated optical performance of the radiation sources.

Typical thermal reaction times of light-emitting diodes used, for example, in the radiation sources, lie in the microsecond range, which far exceed the time duration of a symbol, which lies in a range of less than 100 nanoseconds.

Figure 10:
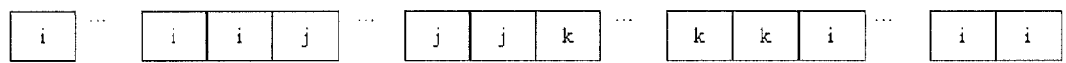
FIG. 10 illustrates a structural image for the representation of a temporal sequence of symbols within an exemplary calibration message.

It is therefore proposed, according to one embodiment in anticipation of the description of FIG. 10, that each symbol be repeated sufficiently often until a thermal equilibrium is attained in the respective radiation sources in order then to change to the next symbol.

The signal of the intensity vector $s_{Rx}$ received at the receiver end will then only be of relevance for the last repeated symbols sent within this sequence, since only the symbols located at the end have been transmitted by a respective optical radiation source which is in thermal equilibrium. As an alternative, a mean value is formed over a suitable number of symbols at the end of the sequence.

For typical light-emitting diodes and for the typical transmission rate of presently known data transmission methods by means of visible light, an approximately 100-fold repetition of each symbol is reasonable before a change is made in a cyclic manner to a symbol corresponding to the next corner point in the constellation diagram.

In this situation the receiver RX transmits the respective value of the optical performance, received at the respective optical radiation receiver in the form of a received intensity vector $s_{Rx}$, back to the transmitter. As an alternative, an intensity vector is transmitted back with a respective mean value determined for all three corner points of the constellation diagram.

At this juncture it is to be noted that the use proposed here of the CSK modulation for the color stabilization is only one of many possible implementation examples. Another example is the use of what are referred to as on-off keying modulation. In this situation, for example, during the "on" phase all three light sources are actuated in such a way that the mixed color of the transmitted light corresponds to that of the color focal point of the CSK symbols transmitted during the data traffic.

Then, during the "off" phase, for example, nothing is transmitted. In one embodiment only "on" symbols can be transmitted, i.e. the light source remains constantly on during the transmission of the symbols.

During the selection of the symbol repetition rate, account must also be taken of the fact that the total time required for a cyclic run-through of all the corner points of the constellation diagram should be shorter than the time which is appreciated by the human eye as flickering. If, for example, a maximum permissible period of 5 milliseconds is provided for as the limit for flicker-free appraisal, then the symbol sequence for each of the three corner points may be a maximum of 1.66 milliseconds.

Since changes arise in the quantum efficiency of the radiation sources in longer time scales of seconds, minutes, or even hours, a return of a respective intensity vector of an optical performance received at the respective optical radiation receiver to the transmitter after every symbol sequence is not absolutely necessary. Instead, a timer can be used in the receiver, which determines how often the said intensity vectors are to be transmitted.

FIG. 7 shows a function of the optical radiation performance P of a light-emitting diode allocated to a respective radiation source Ti,Tj,Tk, as a function of a driver alternating current IAC fed to it. This function is also designated as an alternating-current dependent quantum efficiency of the light-emitting diode. The alternating current behavior of the quantum efficiency is, according to FIG. 7, linear or quasi-linear.

The unbroken line shown in FIG. 7 corresponds in this situation to an original quantum efficiency QE1, which changes in the course of an operation of the radiation source, in this case, for example, being reduced, represented by the broken line shown beneath it, in accordance with a changed quantum efficiency QE2.

The consequence of this changed quantum efficiency QE2 is that, for a given driver alternating current i, the original optical performance $p_0$ drops to a lower value $p_0'$. In order obtain the original value of the transmitted optical performance $p_0$ again, within the framework of a compensation, and therefore stabilization of the color coding, the driver alternating current must be changed to a higher value, i'.

Figure 8:
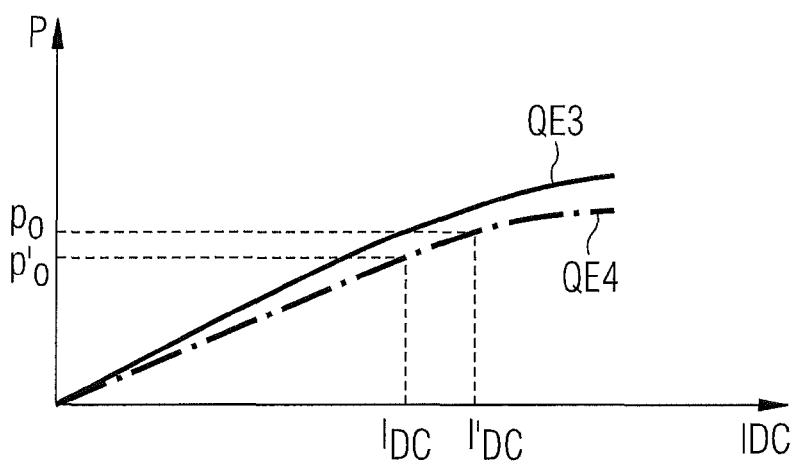
FIG. 8 illustrates a direct current behavior of an optical radiation performance of a radiation source as a function of a supplied driver current.

Represented in FIG. 8 is a function of a quantum efficiency of the light-emitting diode, as a function of a driver current IDC conducted to it. The quantum efficiency in this situation is represented by way of a direct-current behavior in respect of the driver current IDC. The direct-current behavior of the quantum efficiency, according to FIG. 8, is non-linear. The reasons for this non-linearity are of diverse kinds, and are incurred, for example, by thermal inertia and/or possible saturation effects in the light-emitting diode.

The stabilization of the color coding by means of a compensation of transmission parameters is used, according to some embodiments, for a compensation of the non-linear quantum efficiency. In the same way, a compensation in respect of the linear quantum efficiency can also be carried out, without specially altered measures needing to be provided for this.

FIG. 10 shows, by way of example, a calibration message or a series of calibration messages, with a temporal sequence of repeated symbols i,j,k. With these calibration messages, according to one embodiment, at least one sequence is transmitted, within which at least one optical radiation source, allocated to an elementary color, is adjusted to a value of an optical performance which is to be transmitted.

The individual symbols i,j,k of a respective sequence correspond in this situation, for example, to the upper corner points in the constellation diagram. Due to a seamless sequential arrangement of a plurality, for example one hundred to one thousand, of symbols i,j,k, in each case exhibiting a temporal duration of less than 1 µs, within a sequence, a temporally longer full illumination of the optical radiation sources will be obtained, by means of which the establishment of a thermal equilibrium will be attained, and thereby the stabilization of the focal point in the constellation diagram. In the drawing, in this situation, only the respective first and last symbols i,j,k of a respective frequency are represented, and the points omitted are represented respectively by dots. After a sequence of one hundred to one thousand symbols i of a first elementary color, corresponding to a first corner point in the constellation diagram, a sequence of one hundred to one thousand symbols j of a second elementary color follows, corresponding to a second corner point in the constellation diagram. This is then followed by a sequence of one hundred to one thousand symbols k of a third elementary color, corresponding to a third corner point in the constellation diagram, in order then to continue further with a sequence of one hundred to one thousand symbols i of a first elementary color.

According to one embodiment, for such calibration messages use can be made in particular of what are referred to as "visibility frames". According to the Standard 802.15.7, still in preparation, light can be irradiated by optical radiation sources which are not necessarily themselves used for a data transmission. This follows the aim of implementing functions which do not primarily serve a data transmission. Such functions include, for example, optically appreciable signaling of warnings.

For these functions, packets or frames are provided for, which do indeed contain an MAC data head entry of "header", but no data actually intended for a transmission in a payload of the frame. The payload instead contains data which creates visible information, such as color variations or flashing signals, which signal, for example, a communication status or an error message. The said frames are also designated as "Color Visibility Dimming Frames", or CVD frames. CVD frames can also be transmitted in an inactivity mode (standby) for the maintaining of a dimmable ambient lighting arrangement.

Based on another consideration of FIG. 9, a determination of the compensation information will now be explained.

In order to determine the pieces of compensation information at the transmitter TX end, the receiver-end intensity vectors $s_{RX}$ are required as a reference signal. For this purpose, a respective value of the optical performance received at the respective optical radiation receiver is transmitted to the transmitter TX in the form of one or a plurality of receiver-end received intensity vectors $s_{RX}$ via the optical back channel BC.

The receiver-end intensity vector is stored at the receiver end as the reference intensity vector $S_{RX,0}$. Measurements which follow sequentially of the received signal intensity for an unchanged calibration message incur time-dependent intensity vectors $s_{Rx,s}$ for the respective marked time $t_s$. In the event of a component in the intensity vector $s_{Rx,s}$ presenting significant differences in relation to the corresponding components of the reference intensity vector $s_{RX,0}$, the signals which are to be transmitted for an optical data transmission are corrected in the respective correction elements Ci, Cj, Ck by the diagonal elements of the compensation matrix C, and in particular are multiplied.

A decision as to when such a correction is required can be taken on the basis of a value of the diagonal elements of the compensation matrix C itself. If these diagonal elements deviate significantly from a value of 1, a correction of the present compensation factors is required. Whether a deviation is to be assessed as significant can be decided either on the basis of a predetermined value range, such as, for example, a deviation of 5%, or the decision can be taken on the basis of the data itself. An example of this is the involvement of a histogram of the diagonal elements of the compensation matrix C. A significant difference can in this situation be assessed as an exceeding of a predefined confidence interval, such as, for example, a 95% confidence interval.

In order to avoid damage to or saturation of the light-emitting diodes, or a saturation of the analog-digital or digital-analog converter on a bit level, an a-priori maximum level can be introduced for the three values of the intensity vector $s_{Tx}^{(b)}$ and its corrected value $s_{Tx}$.

Changes which affect all the elementary colors in the same manner, such as, for example, changes in the length of the optical transmission path TRM, can be identified by a comparison of all the diagonal elements of the compensation matrix C. If all the components of this matrix C experience the same relative change, a compensation is not required.

In the event that adjacent diagonal elements of the matrix C deviate significantly from a value of zero, an impediment of the transmission path can be assumed for reasons other than those explained hitherto. An example of such impediment is the blocking of only one optical radiation source against crosstalk. This indicates, by way of example, that the optical radiation receiver Ri is indeed receiving optical radiation transmitted by the radiation source Ti, but not the optical radiation transmitted by the other radiation sources Tj, Tk. In such a case, the driver current of the affected optical radiation sources Tj, Tk will not be compensated. Instead, this information can, for example, be used for a warning message generated by the transmitter TX. Another option is the use of a revised reference intensity vector $s_{Rx,0}$ and a further use of this revised reference intensity vector $s_{Rx,0}$ for the further compensation.

On the basis of FIG. 11, an allocation or association of a general network node in respect of a coordinator is explained hereinafter. With such a message exchange, a revised message structure is explained on the basis of an exemplary embodiment.

A change in the terminology of the functional components described in the foregoing embodiments as the transmitter TX and very largely described hereinafter as the coordinator is due to a general description in which the coordinator comprises at least one transmitter TX. This applies by analogy to the network nodes, which comprise at least one receiver RX.

Figure 11:
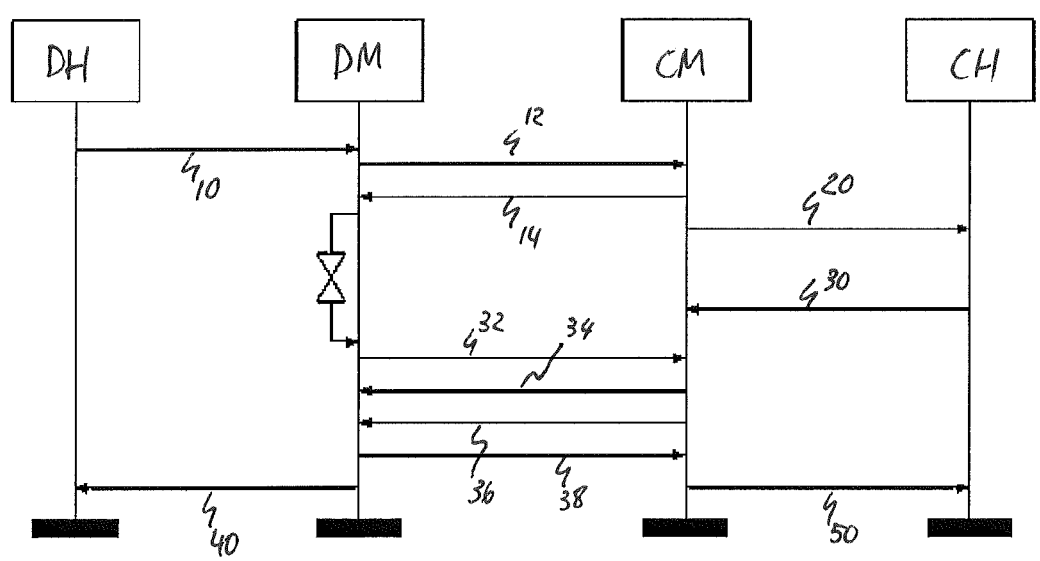
FIG. 11 illustrates a structural image for the representation of a temporal sequence of messages exchanged in an association of a network node with a coordinator, on the basis of an optical transmission of data.

FIG. 11 shows a message sequence for the allocation of a network node as referred to, also designated as a device or network device with a coordinator. Functional components of the coordinator are in this situation arranged in the right-hand half of the figure. These functional components comprise a MAC-layer side component CM of the coordinator, also known to persons skilled in the art as "coordinator MLME", and a higher layer of the coordinator CH represented at the outermost right edge. The higher layer of the coordinator CH is also designated among persons skilled in the art as "Coordinator Next Higher Layer".

Represented on the left side of FIG. 11 are accordingly two layers of the network node, specifically a MAC layer of the network node DM, which is also designated among persons skilled in the art as "Device MLME", as well as a higher layer of the network node DH at the outermost left edge. The higher layer of the network node DH is also designated among persons skilled in the art as "Device Next Higher Layer".

As soon as a network node enters a network which is administered by a coordinator, this network node transmits its technical capabilities for color stabilization in CSK connections. It is assumed hereinafter that at least one connection is designed as a CSK connection. If this is not the case, then in general no color stabilization functions are necessary in the network.

Without restriction on the general considerations, it is assumed hereinafter that only one network node is required to transmit current data with regard to a color stabilization. The network node and the coordinator thereupon carry out the message exchange represented in FIG. 11.

The message exchange according to FIG. 11 is represented with the involvement of the MAC layer of the network node DM and of the MAC layer of the coordinator CM. Attention is drawn to the fact that the message exchange of the messages represented hereinafter with the involvement of the MAC layers DM, CM takes place strictly speaking on a physical "PHY" layer. For the purpose of a simpler representation of the layers, a representation of the physical "PHY" layer has been omitted.

At the beginning of this sequence, an allocation request 10 is transmitted from the higher layer of the network node DH to the MAC layer of the network node DM. According to the Standard 802.15.7, still in preparation, the allocation request 10 is also designated as "MLME-ASSOCIATE.request".

By transmitting the allocation request 10, the network node is requesting an allocation, and with the allocation request 10 it also transmits its technical capabilities for a receiver-end performance of a CSK color stabilization.

On receipt of the allocation request 10, the MAC layer of the network node DM transmits an allocation request 12 to the MAC layer of the coordinator CM. The allocation request 12 is by convention also designated as an "association request".

The MAC layer of the coordinator CM confirms the allocation request 12 with a confirmation 14. The confirmation is by convention also designated as "acknowledgement". Hereinafter it is assumed, in part tacitly, that a request message is in principle acknowledged by a confirmation message from the opposite end.

After receipt of the allocation requests 10, 12, an allocation enquiry 20, by convention also designated as "MLME-ASSOCIATE.indication", is transmitted from the MAC layer of the coordinator CM to the higher layer of the coordinator CH. There a decision is taken as to whether and where a color stabilization will be called up. In the situation in which the connection which is to be set up is a duplex-CSK connection, the coordinator is at liberty to support a color stabilization of the network node. As already mentioned, in this description only the general situation is explained in which the color stabilization is carried out by the coordinator. All other possible situations can be derived with the knowledge of the respective person skilled in the art from the special description of this application situation.

Once the decision has been taken as to whether and where a color stabilization should be called up, an allocation response 30 is transmitted from the higher level of the coordinator CH to the MAC layer of the coordinator CM, to which is appended a corresponding field "Capability-Negotiation-Response", in accordance with a manner to be described hereinafter. The allocation response 30 is by convention also designated as "MLME-ASSOCIATE.response".

The information in this "Capability-Negotiation-Response" field is next converted by the MAC layers of the coordinator CM and of the network node DM into appropriate MAC messages 36, 3, which are explained hereinafter. The messages 32, 34 likewise represented in the drawing are placeholders for other messages which are carried out in the interim and do not have any relevance to the association shown, and are therefore not described any further here.

The MAC layer of the coordinator CM transmits an allocation response 36 to the MAC layer of the network node DM, which is confirmed by the MAC layer of the network node DM by a confirmation 38. The allocation response 36 is by convention also designated as "Association response, and the confirmation 38 also as "Acknowledgement".

The MAC layer of the network node DM awaits an allocation, notice of which has been given by the allocation response 36 to the allocation request 12, confirmed by the confirmation 14, within an adjustable period of time, which is monitored by a timer. This period of time is also designated as "macReponseWaitTime", and is represented in the drawing by two triangles adjoining one another at their tips.

After a complete transmission of the messages 36 and 38 referred to, the higher layer of the network node DM transmits an allocation confirmation 40 to the higher level of the network node DH for a further performance of the color stabilization method. The allocation confirmation 40 is by convention also designated as "MLME-ASSOCIATE.confirm".

In the same manner, the allocation is notified, with the aid of a status display 50, from the MAC layer of the coordinator CM to the higher layer of the coordinator CH. The status display 50 is by convention also designated as "MLME-COMM-STATUS.indication".

Once this allocation has been concluded, the coordinator now sends calibration messages in the form of "visibility frames" to the network nodes, and receives from the network nodes a respective value of an optical performance received at the respective optical radiation receiver, in the form of the signal intensity vector $s_{Rx}$.

In order to implement the disclosed method with regard to the protocol of control messages exchanged, with an association of units for dealing with technical possibilities for the color compensation, a revision is proposed of the message structure in accordance with the protocol of the Standard 802.15.7, still in preparation. At this juncture it may again be emphasized that the disclosed solution of an exclusive transmission of values of an optical performance received at the respective optical radiation receiver, and the omission of further receiver-end processing of the values, requires only slight changes in the protocol.

The semantics of the allocation request 10 is represented hereinafter:

| | |
|---|---|
| MLME-ASSOCIATE.request | ( |
| | LogicChannel |
| | CoorAddrMode, |
| | CoordWPANId, |
| | CoordAddress, |
| | CapabiltyInformation, |
| | SecurityLevel, |
| | KeyIdMode, |
| | KeySource, |
| | KeyIndex |
| | ) |

According to one embodiment, a revision of the parameter "CapabilityInformation" is carried out in the allocation request 10, which is explained hereinafter. The parameter "CapabiltyInformation" specifies the technical capabilities of the network element to be allocated, and possesses the data type "Bitmap", which can accommodate a data item with variable length and content.

The semantics of the allocation display 20 is represented hereinafter:

| | |
|---|---|
| MLME-ASSOCIATE.indication | ( |
| | DeviceAddress, |
| | CapabilityInformation, |
| | SecurityLevel, |
| | KeyIdMode, |
| | KeySource, |
| | KeyIndex |
| | ) |

According to one embodiment, a revision of the parameter "CapabilityInformation" is also carried out in the allocation display 20, which is explained hereinafter.

The semantics of the allocation response 30 are represented hereinafter:

| | |
|---|---|
| MLME-ASSOCIATE.response | ( |
| | DeviceAddress |
| | AssocShortAddress |
| | status, |
| | CapabilityNegotationResponse |
| | SecurityLevel, |
| | KeyIdMode |
| | KeySource, |
| | KeyIndex |
| | ) |

According to one embodiment, a definition of the new parameter "CapabilityNegotiationResponse" is carried out in the allocation response 30, which is explained hereinafter.

The parameter "CapabilityNegotiationResponse" specifies a response from the coordinator to the allocation request from the network element.

The semantics of the allocation confirmation 40 is represented hereinafter:

| MLME-ASSOCIATE.confirm | ( |
|---|---|
| | AssocShortAddress, |
| | status, |
| | CapabilityNegotiationResponse |
| | SecurityLevel, |
| | KeyIdMode, |
| | KeySource, |
| | KeyIndex |
| | ) |

According to one embodiment, a definition of the new parameter "CapabilityNegotiationResponse" is also carried out in the allocation confirmation 40, which is explained hereinafter.

A revision of the parameter "CapabilityInformation" is explained hereinafter. A "Capability Information Element" relating to this exhibits the following structure:
Capability Information Field . . .

In the representation given above and hereinafter, the abbreviation " . . . " signifies that a corresponding entry has no significance for the implementation of the exemplary embodiment concerned.

The Capability Information Element includes several fields, of which only the Capability Information Field is taken into consideration hereinafter. The Capability Information Field lists the general technical capabilities of the network node, which are represented by way of example in the following table:

| Layer | Bit | Function |
|---|---|---|
| . . . | . . . | . . . |
| PHY-layer capabilities | 26 | Alternate PHY (CSK) support |
| . . . | . . . | . . . |

A revision of the parameters of the Capability Information Element is carried out in respect of the parameter color-stabilization capability (CSK), wherein, according to one embodiment, the following semantics are allocated to the bits 27-28 of the Capability Information Field:

| Bits 27-28 | Color-stabilization scheme |
|---|---|
| 00 | No color-stabilization |
| 01 | Color stabilization information to be sent from device to coordinator upon reception of visibility frames |
| 10 | Color stabilization information to be sent from coordinator to device upon reception of visibility frames |
| 11 | Color stabilization information to be sent from device to coordinator and from coordinator to device when either receives visibility frames |

Specifically, a value of the bits 27-28 of "00" signifies that no color stabilization is possible, a value of "01" that a piece of color stabilization information is to be sent from the network node to the coordinator after reception of visibility frames, a value of "10" that a piece of color stabilization information is to be sent from the coordinator to the network node after reception of visibility frames, and a value of "11" that a piece of color stabilization information is to be sent both from the network node to the coordinator as well as vice-versa after reception of visibility frames, which were received either from the network node and/or from the coordinator. It is important, however, to point out that the precise bit allocation is free. For example, a coding of "11" could also acquire the significance of "No color stabilization".

Explained below is a definition by way of example of the new parameter "CapabilityNegotiationResponse". The following structure demonstrates a "Capability-Negotiation-Response" field pertaining to this:

| | Bit | Function |
|---|---|---|
| . . . | . . . | . . . |
| Requested PHY-Layer capabilities | 1-2 | Color stabilization scheme |
| . . . | . . . | . . . |

The "Color-stabilization scheme" field revised according to one embodiment of exhibits the following semantics:

| Bits | Color-stabilization scheme |
|---|---|
| 00 | No color-stabilization |
| 01 | Color stabilization information to be sent from device to coordinator upon reception of visibility frames |
| 10 | Color stabilization information to be sent from coordinator to device upon reception of visibility frames |
| 10 | Color stabilization information to be sent from device to coordinator and from coordinator to device upon reception of visibility frames |

If the "Capability-Negotiation Response" only contains one function, namely the color stabilization, then the two tables shown above are identical. With regard to the messages exchanged on the MAC layer, in particular the allocation word 36 and other messages exchanged on the MAC layer, according to one embodiment further revisions are carried out. A listing of these "MAC Command Frames" is shown below by way of example:

| Command-frame | | Device | |
|---|---|---|---|
| identifier | Command name | Tx | Rx |
| . . . | . . . | . . . | . . . |
| 0 × 14 | Color-stabilization-timer notification | X | X |
| 0 × 15 | Color-stabilization information | X | X |
| . . . | . . . | . . . | . . . |

With the aid of a revised MAC message, "Color-stabilization information", a transmission of a respective value of an optical performance received at the respective optical radiation receiver is supported in the form of the signal intensity vector $s_{Rx}$. This message exhibits the revised format shown below:

| Octets | 1 | 2 | 6 |
|---|---|---|---|
| MHR fields | Command-frame identifier | Short Address | Color-stabilization information |

For an explanation of the fields, reference is made to the Standard 802.15.7, still in preparation. It is important to note that the size of the color-stabilization information also allows for an entire signal vector to be transferred with a more than adequate resolution (16 bits).

The transmission of a respective value of an optical performance received at the respective optical radiation receiver in the form of the signal intensity vector $s_{Rx}$ takes place in the "color-stabilization information" field.

With the aid of a revised MAC message, "Color-stabilization timer", a definition of a time interval is now supported, after the expiry of which a new color stabilization is initiated. This message exhibits a revised format shown below:

| Octets | 1 | 2 | 2 |
|---|---|---|---|
| MHR fields | Command-frame identifier | Short Address | Color-stabilization timer |

For an explanation of the fields, reference is made to the Standard 802.15.7, still in preparation.

As a supplement to the formation of the time interval as referred to in the Standard, other time intervals are also possible. For example, the time between two stabilization messages, such as <binary1>×10^(binary2) can be calculated, wherein {Color-stabilization timer}={binary1 binary2}.

An alternative basis to 10 is likewise possible. It is recommended that the standard value of the timer be selected from the seconds or minutes range. A value which has proved its worth in practice lies in a range around 10 seconds.

According to one embodiment, a revision of PIB PIB (Physical-Layer Personal-Area-Network Information Base) attributes is provided for, in accordance with the following representation by way of example:

| Attribute | Identifier | Type | Range | Description |
|---|---|---|---|---|
| macColorStabilization | 0 × 5f | Binary Integer | 00-11 | The color-stabilization action entailed when receiving visibility frames |
| macColorStabilization Timer | 0 × 60 | Integer | 0-65 535 | Time between two stabilization measurements, i.e. $s_{Rx}$ that are sent back to the corresponding CSK Tx |

In addition to this, alternative size ranges for the timer are also possible; see the remarks above.

A further advantage of certain embodiments is that, with one and the same setting in the association phase, both a compensation of the direct-current related quantum efficiency as well as of the alternating-current related quantum efficiency is made possible. Since the receiver only transmits back signals which have been received, it does not need to differentiate whether these are at the end measured as longer visibility frames, as for the direct-current related compensation, or shorter visibility frames, as for the alternating-current related compensation.

Accordingly, the transmitter, inasmuch as it measures the length of the CSK frames, has the flexibility to determine one mode or the other, by way of the length of the visibility frames transmitted. Further MAC signaling, such as was necessary in previously-known methods, is therefore advantageously superfluous in accordance with certain embodiments.

What is claimed is:

1. A method for stabilizing a color coding for optical transmission of data, comprising:
providing a color coding method based on a plurality of elementary colors for transmission of data between a transmitter and receiver,
transmitting a respective elementary color by at least one transmitter-end optical radiation source and receiving the respective elementary color at the receiver end by at least one respective optical radiation receiver,
forming by the transmitter at least one calibration message defining, for at least one time sequence, an adjustment of a value of an analog transmission parameter of optical performance of at least one optical radiation source allocated to an elementary color,
sending the at least one calibration message by the transmitter, including implementing the adjustment of the value of the analog transmission parameter of optical performance of the at least one optical radiation source,
receiving the at least one calibration message at the receiver, and determining and sending to the transmitter a signal representing a respective value of an analog reception parameter of an optical performance received at the respective optical radiation receiver,
comparing by the transmitter the respective value representing the analog reception parameter of the optical performance received at the respective optical radiation receiver with the respective adjusted value of the analog transmission parameter of the optical performance sent at the respective optical radiation source,
based on the comparison, determining compensation information and adjusting at least one transmission parameter based on the determined compensation information.

2. The method of claim 1, wherein the calibration message is formed as a CVD frame.

3. The method of claim 1, wherein each of a plurality of sequential calibration messages include an identical coding that corresponds to a corner point in a constellation diagram.

4. The method of claim 3, comprising determining the optical performance received at the respective optical radiation receiver, which is received at each optical radiation receiver with the identical coding, after one or a plurality of sequential calibration messages.

5. The method of claim 4, comprising determining a mean value from values of the optical performance received at the respective optical radiation receiver.

6. The method of claim 1, further comprising a process for allocating a network node by a coordinator, wherein a scope and type of the stabilization of the color coding is determined by the coordinator.

7. The method of claim 6, wherein the process for allocating the network node includes the network node providing an allocation response in which the network node transmits to the coordinator information indicating technical capabilities of the network node.

8. The method of claim 6, wherein a message identifying a defined time interval is transmitted, after the expiry of which a further stabilization of a color coding is triggered.

9. An optical transmission system for optical transmission of data between a transmitter and a receiver, established for coding and transmission of data, making use of a color coding method based on a plurality of elementary colors, the optical transmission system comprising:
a transmitter-end optical radiation source configured to:
transmit an elementary color, transmit a calibration message having an adjusted value of an analog transmission parameter of optical performance of the transmitter-end optical radiation source,
a receiver-end optical radiation receiver configured to:
  receive the elementary color,
  receive the calibration message,
an evaluation unit provided in the receiver and configured to determine a value of an analog reception parameter of an optical performance received at the optical radiation receiver,
a back channel for transmitting the value determined by the evaluation unit,
a color stabilization module provided in the transmitter and configured to determine at least one compensation factor based on a relationship between the value of the an analog reception parameter of optical performance received at the optical radiation receiver and the adjusted value of the analog transmission parameter of the optical performance transmitted to the optical radiation source via the calibration message, and
a correction element provided in the transmitter and configured to determine compensation information based on the relationship, and to adjust at least one transmission parameter based on the determined compensation information.

10. The system of claim 9, wherein the calibration message is formed as a CVD frame.

11. The system of claim 9, wherein each of a plurality of sequential calibration messages include an identical coding that corresponds to a corner point in a constellation diagram.

12. The system of claim 9, further comprising a process for allocating a network node by a coordinator, wherein a scope and type of the stabilization of the color coding is determined by the coordinator.

13. The method of claim 12, wherein the process for allocating the network node includes the network node providing an allocation response in which the network node transmits to the coordinator information indicating technical capabilities of the network node.

14. The system of claim 12, wherein a message identifying a defined time interval is transmitted, after the expiry of which a further stabilization of a color coding is triggered.

* * * * *